US011591503B2

(12) United States Patent
Frick et al.

(10) Patent No.: US 11,591,503 B2
(45) Date of Patent: Feb. 28, 2023

(54) SHAPE MEMORY MATERIAL WITH IMPROVED MECHANICAL PROPERTIES

(71) Applicant: SIKA TECHNOLOGY AG, Baar (CH)

(72) Inventors: Karsten Frick, Remetschwil (CH); Alina Keller, Thalwil (CH)

(73) Assignee: SIKA TECHNOLOGY AG, Baar (CH)

( * ) Notice: Subject to any disclaimer, the term of this patent is extended or adjusted under 35 U.S.C. 154(b) by 374 days.

(21) Appl. No.: 16/957,304

(22) PCT Filed: Jan. 25, 2019

(86) PCT No.: PCT/EP2019/051900
§ 371 (c)(1),
(2) Date: Jun. 23, 2020

(87) PCT Pub. No.: WO2019/145503
PCT Pub. Date: Aug. 1, 2019

(65) Prior Publication Data
US 2020/0385615 A1 Dec. 10, 2020

(30) Foreign Application Priority Data
Jan. 25, 2018 (EP) .................................... 18153406

(51) Int. Cl.
*C09J 163/00* (2006.01)
*B29C 61/06* (2006.01)
(Continued)

(52) U.S. Cl.
CPC ............. *C09J 163/00* (2013.01); *B29C 61/06* (2013.01); *C08L 23/06* (2013.01);
(Continued)

(58) Field of Classification Search
USPC .......................................... 525/187; 156/330
See application file for complete search history.

(56) References Cited

U.S. PATENT DOCUMENTS 6,846,559 B2 * 1/2005 Czaplicki ............... C09J 151/08
525/122
7,847,026 B2 * 12/2010 Bertsch .................. C08L 63/00
525/107
(Continued)

FOREIGN PATENT DOCUMENTS

WO 2011/056357 A1 5/2011
WO 2011/117398 A1 9/2011
WO 2011/117402 A1 9/2011

OTHER PUBLICATIONS

Mar. 28, 2019 Search Report issued in International Patent Application No. PCT/EP2019/051900.
(Continued)

*Primary Examiner* — Fred M Teskin
(74) *Attorney, Agent, or Firm* — Oliff PLC

(57) ABSTRACT

A composition includes an epoxy-based curable adhesive having at least one an epoxy resin modified acrylonitrile-butadiene copolymer and at least one thermoplastic elastomer. The at least one thermoplastic elastomer is present in the curable adhesive as a penetrating polymer network. Further, an expandable article is composed of the composition, a reinforcing element includes a support and an expandable article, a method for reinforces cavities of structural components, and the composition is used as a shape memory material.

16 Claims, 3 Drawing Sheets

(51) Int. Cl.
*C08L 23/06* (2006.01)
*C08L 23/08* (2006.01)
*C08L 23/12* (2006.01)
*C09J 115/00* (2006.01)
*C08C 19/06* (2006.01)

(52) U.S. Cl.
CPC ........... *C08L 23/0853* (2013.01); *C08L 23/12* (2013.01); *C09J 115/00* (2013.01); *C08C 19/06* (2013.01); *C08L 2201/12* (2013.01)

(56) References Cited

U.S. PATENT DOCUMENTS

| | | |
|---|---|---|
| 9,796,809 B2 | 10/2017 | Frick et al. |
| 2005/0022929 A1 | 2/2005 | Schoenfeld et al. |
| 2013/0034736 A1 | 2/2013 | Gossi et al. |
| 2013/0186562 A1 | 7/2013 | Finter et al. |

OTHER PUBLICATIONS

Mar. 28, 2019 Written Opinion of the International Searching Authority issued in International Patent Application No. PCT/EP2019/051900.

\* cited by examiner

SHAPE MEMORY MATERIAL WITH IMPROVED MECHANICAL PROPERTIES

TECHNICAL FIELD

The invention relates to the field of expandable adhesive compositions used for reinforcing of structural components, such as those used in bodies of automotive vehicles. In particular, the invention relates to adhesive compositions, which can be expanded to a desired direction also without the use of physical or chemical blowing agents.

BACKGROUND OF THE INVENTION

Hollow structural components are commonly used in bodies and/or frames to reduce the weight of water, land or air vehicles. Especially in automotive industry, reducing vehicle weight in order to meet the increasingly stringent fuel economy and emission requirements, has been a key challenge in design of modern automotive vehicles. The use of hollow structural components provides effective means for reducing weight of vehicles but it also results in decreased stability and strength of the structures. In addition, the cavities provide, due to the larger surface of the hollow component, a larger contact surface for corrosion, in case moisture or dirt is entered therein. Noise caused, for example, by wind or vibration can also be effectively transferred in or along such cavities.

In order to meet the safety and structural performance requirements, hollow structural components are typically reinforced using local reinforcing elements. Such reinforcing elements typically consist of metals and/or plastics or a combination of these materials. In addition, expandable compositions, in particular expandable adhesive compositions, also known as structural foams, are often used in locations that are difficult to access, for example, in locations which can only be reinforced or sealed after the installation of the component. This is typically the case in the production of vehicle structures or bodies. Structural foams have the advantage that they can be inserted into a cavity in an unexpanded state and foamed after installation of the component, in particular by increasing temperature. Consequently, the inner wall of the cavity can, for example, be completely coated after the installation of the reinforcement element by way of cathodic dip-coating (KTL) and afterwards reinforced by activating the structural foam. Here, the foaming is typically conducted during the curing of the applied KTL layer in an oven. The State-of-the-Art structural foams typically have the disadvantage that the mechanical properties of the adhesives are typically negatively affected by the foaming process.

Adhesive compositions that can be used as shape memory materials have also been suggested as alternatives for structural foams. Published patent applications WO 2011/117402 and WO 2011/117398 disclose compositions comprising a curable structural adhesive and at least one thermoplastic elastomer. These compositions can be brought from a dimensionally stable temporary shape to an expanded permanent shape, for example, by heating the composition above the glass transition temperature of the curable adhesive. When used for reinforcing cavities of structural components, the composition provided in a deformed shape, inserted to a cavity of the structural component, expanded, and cured by initiating the curing reaction of adhesive.

The expandable adhesives having a shape memory property have the advantage over structural foams that the expansion is conducted without a foaming process and, therefore, the mechanical properties of the cured adhesive are well preserved. However, combining high recovery rate based on a shape memory effect with good mechanical performance, in particular high lap shear strength, has turned out to be difficult to achieve with the compositions disclosed in WO 2011/117402 and WO 2011/117398. In particular it has been found out that increasing the amount of thermoplastic elastomer enables high recovery rates but not without having a negative effect on the mechanical properties of the cured adhesive.

There thus remains a need for an expandable adhesive composition, which can be used for providing reinforcing elements for reinforcing cavities of structural components and which provides high expansion rates combined with high mechanical performance after curing of the adhesive.

SUMMARY OF THE INVENTION

The object of the present invention is to provide a composition, which is able to solve or at least partially mitigate the problems related to the State-of-the-Art expandable adhesives suitable for providing reinforcing elements.

The subject of the present invention is a composition as defined in claim 1.

It was surprisingly found out that a composition comprising a curable epoxy resin adhesive containing at least one epoxy resin modified acrylonitrile-butadiene copolymer and at least one thermoplastic elastomer provides high recovery rates based on a shape memory effect as well as high mechanical performance after curing of the epoxy resin adhesive.

One of the advantages of the composition of the present invention is that it can be used for providing expandable articles without use of chemical or physical blowing agents.

Another advantage of the composition of the present invention is that it provides mechanical performance, which is comparable to that of high strength reactive adhesives and a recovery rate based on a shape memory effect, which required in typical reinforcing applications.

Other aspects of the present invention are presented in other independent claims. Preferred aspects of the invention are presented in the dependent claims.

DETAILED DESCRIPTION OF THE INVENTION

Figure 1:
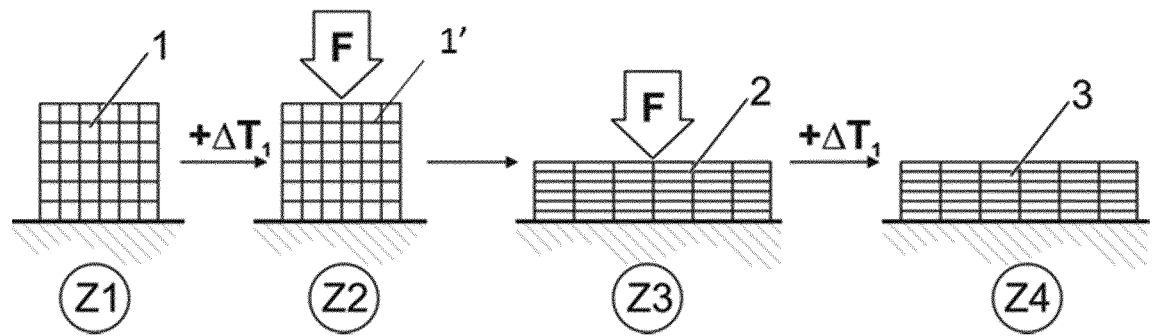
FIG. 1 shows a schematic presentation of the method for producing the expandable article of the present invention.

The subject of the present invention is a composition comprising:
i) A curable adhesive comprising:
a) At least one epoxy resin and
b) At least one epoxy resin modified acrylonitrile-butadiene copolymer, and ii) At least one thermoplastic elastomer, wherein the at least one thermoplastic elastomer is present in the curable adhesive as a penetrating polymer network.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "elastomer" refers to any polymer or combination of polymers, which is capable of recovering from large deformations, and which can be, or already is, modified to a state in which it is essentially insoluble (but can swell) in a boiling solvent. Typical elastomers are capable of being elongated or deformed to at least 200% of their original dimension under an externally applied force, and will substantially resume the original dimensions, sustaining only small permanent set (typically no more than about 20%), after the external force is released. As used herein, the term "elastomer" may be used interchangeably with the term "rubber."

The term "thermoplastic" refers to any material which can be melted and re-solidified with little or no change in physical properties.

The term "thermoplastic elastomer" designates in the present disclosure polymeric materials that exhibit rubber elasticity over a specified temperature range but which at elevated temperatures can be processed as a thermoplastic.

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight may be determined by gel permeation chromatography.

The term "glass transition temperature" ($T_g$) refers to the temperature above which temperature a polymer component becomes soft and pliable, and below which it becomes hard and glassy. The glass transition temperature can be determined by differential scanning calorimetry (DSC) measurement conducted according to ISO 11357 standard. The measurements can be performed with a Mettler Toledo 822e device at a heating rate of 2 degrees centigrade/min. The glass transition temperature values can be determined from the measured DSC curve with the help of the DSC software.

The term "softening point" refers to a temperature at which compound softens in a rubber-like state, or a temperature at which the crystalline portion within the compound melts. The softening point can be determined by ring and ball measurement conducted according to DIN EN 1238 standard.

The term "melting temperature" refers to a crystalline melting point ($T_m$) as determined by differential scanning calorimetry (DSC). Preferably, the melting temperature is determined by DSC according to ISO 11357:2018 standard. In particular, the melting temperature can be determined as a maximum of the curve determined by means of differential scanning calorimetry using a heating rate of 2° C./min. The measurements can be performed with a Mettler Toledo DSC 3+ device and the values of the melting temperature can be determined from the measured DSC-curve with the help of the DSC-software.

The "amount or content of at least one component X" in a composition, for example "the amount of the at least one thermoplastic elastomer" refers to the sum of the individual amounts of all thermoplastic elastomers contained in the composition. For example, in case the composition comprises 20 wt.-% of at least one thermoplastic elastomer, the sum of the amounts of all thermoplastic elastomers contained in the composition equals 20 wt.-%.

The term "room temperature" designates a temperature of 23° C.

The composition of the present invention comprises at least one thermoplastic elastomer, which is present in the curable adhesive as a penetrating polymer network. The expression "present in the curable adhesive as a penetrating polymer network" is understood to mean that the at least one thermoplastic elastomer forms a semi-interpenetrating polymer network with the curable adhesive. The term "semi-interpenetrating polymer network (S-IPN)" refers to a polymer network comprising two or more polymers, wherein at least one of the polymers is in network form, i.e. chemically or physically crosslinked, and at least one of the polymers is not in network form, i.e. non-crosslinked. In case of semi-interpenetrating polymer network (S-IPN), the polymer that is in network form is present in the S-IPN as "a penetrating polymer network".

The term "interpenetrating polymer network (IPN)" refers to a polymer network comprising two or more polymers that are in network form, wherein the polymers are at least partially interlaced on a molecular scale but not covalently bonded to each other and cannot be separated unless chemical bonds are broken. Semi-interpenetrating polymer networks differ from interpenetrating polymer networks also in that the polymers that are not in network form can, in principle, be separated from the polymers that are in network form without breaking of chemical bonds, for example by using solvent extraction techniques. In case of interpenetrating polymer network (IPN), the polymer that is in network form is present in the IPN as "an interpenetrating polymer network".

Thermoplastic elastomers (TPE) include a class of copolymers and blends of thermoplastic polymer and elastomer components. A blend-based TPE can be produced as a reactor blend, in which case the thermoplastic polymer and the elastomer are simultaneously produced in a single reactor vessel using different catalysts, or as a physical blend, wherein the components are separately produced and melt-blended using high-shear mixing technique. Copolymer-type TPEs include both random copolymers and block copolymers. The latter of these are also characterized as semi-crystalline polymers having phase separated hard (crystalline) and soft (amorphous) segments.

Commercially available thermoplastic elastomers include, for example, thermoplastic polyolefins (TPO), styrenic block copolymers (TPS), thermoplastic vulcanizates, (TPV), thermoplastic polyurethanes (TPU), thermoplastic copolyesters (TPC), and thermoplastic polyamides (TPA).

Particularly suitable thermoplastic elastomers for the present invention include olefin-based copolymer elastomers, such as ethylene-α-olefin copolymers and propylene-α-olefin copolymers, as well as ethylene vinyl acetate copolymers (EVA). The olefin-based copolymer elastomers can be random or block copolymers of ethylene or propylene with at least one other α-olefin. These types of compounds are also known as polyolefin elastomers (POE), polyolefin plastomers, or olefin block copolymers (OBC).

Preferably, the composition contains a semi-interpenetrating polymer network (S-IPN) comprising or consisting of a first continuous phase comprising the curable adhesive and a second continuous phase comprising the at least one thermoplastic elastomer. According to one or more embodiments, the first continuous phase is composed of the curable adhesive and the second continuous phase is composed of the at least one thermoplastic elastomer.

It may also be preferred that the curable adhesive and the at least one thermoplastic elastomer are present in the composition as a co-continuous phase. The term "co-continuous phase" refers in the present document to a morphology in which a continuous boundary line is formed between the two phases instead of island-like dispersion of the first phase in second continuous phase or island-like dispersion of the second phase in the continuous first phase. The term "continuous phase" refers in the present document to a phase, which contains at least one connected path of material points lying entirely within that phase and that spans macroscopically ("percolates") across the material sample.

Due to the elastic properties of the at least one thermoplastic elastomer and its presence in the curable adhesive as a penetrating polymer network, the composition can be used as a shape memory material. The term "shape memory material" designates in the present disclosure materials, which are capable of recovering from a dimensionally stable deformed (temporary) shape to a permanent (original) shape induced by an external stimulus, such as a temperature change. The return from the dimensionally stable temporary shape to the original shape is also known as shape memory effect. The difference between conventional elastic recovery and shape memory recovery is that the composition is dimensionally stable in the deformed state, i.e. the composition remains in the temporary shape even after removal of the external force. It is clear for a person skilled in the art that a composition can be used as a shape memory material even if the induced shape memory effect does not result in complete recovery of the permanent shape.

Shape memory materials based on polymers typically comprise a molecular network structure with at least one soft (switch) segment and at least one hard segment, which can be deformed under tension. In case of a thermally induced shape memory effect, the switch from the temporary shape to the permanent shape is conducted by increasing the temperature of the material above the transition temperature ($T_{trans}$) of the soft segments. Depending on the characteristics of the shape memory material, the transition temperature ($T_{trans}$) of the soft segments can be a glass transition temperature ($T_g$) or a melting temperature ($T_m$). Since the flexibility of the soft segments is at least partially limited at temperatures below the transition temperature ($T_{trans}$), the deformed material can be fixed to a temporary shape by lowering the temperature below the transition temperature ($T_{trans}$). In particular, the composition of the present invention can be used as a shape memory material capable of undergoing a thermally induced shape memory effect.

The use of the composition of the present invention as a shape memory material may comprise steps of providing the composition in an original shape, deforming the composition to a temporary shape under externally applied force, and inducing a shape recovery to the original shape by heating. In the first step, the composition is provided in an original shape, in which the at least one thermoplastic elastomer is present in a relaxed (non-strained) state. The composition is then heated above the glass transition temperature ($T_g$) of the curable adhesive and deformed to a temporary shape, in which the at least one thermoplastic elastomer is in a strained state. The deformation from the original shape to the temporary shape has to be completed under tension of the thermoplastic elastomer, i.e. against resistance of the thermoplastic elastomer. Consequently, during the deformation step the temperature of the composition must be above the glass transition temperature ($T_g$) of the curable adhesive and below the melting temperature ($T_m$) of the thermoplastic elastomer. In order to fix the composition to the temporary shape, the composition is cooled below the glass transition temperature ($T_g$) of the curable adhesive while the composition is held in its temporary shape. Finally, the recovery to the original shape is induced by heating the composition above the glass transition temperature ($T_g$) of the curable adhesive.

Preferably, the at least one thermoplastic elastomer has a melting temperature ($T_m$), which is above the glass transition temperature ($T_g$) of the curable adhesive. It may be advantageous that the at least one thermoplastic elastomer has a melting temperature ($T_m$) in the range of 60-200° C., more preferably 70-160° C., most preferably 85-120° C. It may also be preferable that the at least one thermoplastic elastomer has a weight average molecular weight (Mw) in the range of at least 10,000 g/mol, such as in the range of 25,000-500,000 g/mol.

Preferably, the composition comprises the at least one thermoplastic elastomer in an amount of 15-40 wt.-%, more preferably 20-40 wt.-%, even more preferably 25-35 wt.-%, most preferably 25-30 wt.-%, based on the total weight of the composition. Compositions comprising the at least one thermoplastic elastomer in an amount falling within the above cited ranges have been found out to exhibit high shape recovery rates based on thermally induced shape memory effect. The term "shape recovery rate" refers in the present disclosure to the ability of the composition to return from a deformed temporary shape back to the original shape. The shape recovery rate is determined as a ratio of the recovered shape change and deformed shape change:

$$\text{Shape recovery rate} = \frac{(D_R - D_T)}{(D_O - D_T)} \cdot 100\%$$

wherein, $D_R$ is dimension of the composition in the recovered shape, $D_T$ is the dimension of the composition in the temporary shape, and $D_O$ is dimension of the composition in the original shape.

The type of the at least thermoplastic elastomer is not particularly restricted in the present invention. It has, however, been found that thermoplastic elastomers that are entirely miscible with the epoxide resins contained in the curable adhesive have negative influence on the mechanical properties of the cured adhesive. The at least one thermoplastic elastomer is considered to be entirely miscible with the epoxide resins when a blend of these components has one single glass transition point, which can be measured, for example, by using dynamic mechanical thermal analysis (DMTA), for example, as the peak of the measured tan delta curve (ratio of storage and loss moduli).

Preferably, the at least one thermoplastic elastomer is selected from the group consisting of ethylene-based olefin copolymers, propylene-based olefin copolymers, and ethylene vinyl acetate copolymers (EVA). Suitable ethylene-based olefin copolymers include ethylene-α-olefin random and block copolymers of ethylene and one or more $C_3$-$C_{20}$ α-olefin monomers, in particular one or more of propylene, 1-butene, 1-pentene, 1-hexene, 1-heptene, 1-octene, 1-decene, 1-dodecene, and 1-hexadodecene. Suitable propylene-based olefin copolymers include, for example, propylene-ethylene random copolymers and propylene-α-olefin random and block copolymers of propylene and one or more $C_4$-$C_{20}$ α-olefin monomers, in particular one or more of 1-butene, 1-pentene, 1-hexene, 1-heptene, 1-octene, 1-decene, 1-dodecene, and 1-hexadodecene. Particularly suitable ethylene vinyl acetate copolymers include those having vinyl acetate content in the range of 4-40 wt.-%. Such ethylene vinyl acetate copolymers are commonly characterized as thermoplastic elastomers.

Suitable ethylene-based olefin copolymers include, for example, ethylene-based polyolefin elastomers (POE), which are commercially available, for example, from Dow Chemical Company under the trade name of Engage®, such as Engage® 7256, Engage® 7467, Engage® 7447, Engage® 8003, Engage® 8100, Engage® 8480, Engage® 8540, Engage® 8440, Engage® 8450, Engage® 8452, Engage® 8200, and Engage® 8414.

Other suitable ethylene-based olefin copolymers include ethylene-based plastomers, which are commercially available, for example, from Dow Chemical Company under the trade name of Affinity®, such as Affinity® EG 8100G, Affinity® EG 8200G, Affinity® SL 8110G, Affinity® KC 8852G, Affinity® VP 8770G, and Affinity® PF 1140G, and from Exxon Mobil under the trade name of Exact®, such as Exact® 3024, Exact® 3027, Exact® 3128, Exact® 3131, Exact® 4049, Exact® 4053, Exact® 5371, and Exact® 8203.

Further suitable ethylene-based olefin copolymers include ethylene-α-olefin block copolymers, also known as ethylene-based olefin block copolymers (OBC), which are commercially available, for example, from Dow Chemical Company under the trade name of Infuse®, such as Infuse® 9100, Infuse® 9107, Infuse® 9500, Infuse® 9507, and Infuse® 9530.

Suitable propylene-based olefin copolymers include, for example propylene-based plastomers and elastomers (PBE), which are commercially available, for example, from Dow Chemical Company under the trade name of Versify® and from Exxon Mobil under the trade name of Vistamaxx®.

It may be preferably that the at least one thermoplastic elastomer has a melt flow index (MFI) determined according to ISO 1133 (190° C./2.16 kg) of at least 1.0 g/10 min, preferably at least 2.0 g/10 min. In particular, it may be preferable that the at least one thermoplastic elastomer has a melt flow index determined according to ISO 1133 (190° C./2.16 kg) in the range from 1.0 g/10 min to 15.0 g/10 min, more preferably from 1.5 g/10 min to 10.0 g/10 min, most preferably from 2.0 g/10 min to 5.0 g/10 min.

According to one or more embodiments, the at least one thermoplastic elastomer is an ethylene-octene copolymer, preferably ethylene-octene random copolymer. Suitable ethylene-octene copolymers are commercially available, for example, from Dow Chemical Company under the trade name of Engage®, such as Engage® 8003, Engage® 8100, Engage® 8480, Engage® 8540, Engage® 8440, Engage® 8450, Engage® 8452, Engage® 8200, and Engage® 8414. Preferred ethylene-octene copolymers have a melt flow index (MFI) determined according to ISO 1133 (190° C./2.16 kg) of at least 1.0 g/10 min, more preferably in the range from 1.0 g/10 min to 15.0 g/10 min, even more preferably from 1.5 g/10 min to 10.0 g/10 min, most preferably from 2.0 g/10 min to 5.0 g/10 min.

The composition of the present invention comprises a curable adhesive. The term "curable adhesive" refers in the present disclosure to adhesive compositions which develop bonding properties as a result of curing. The term "curing" refers in the present disclosure to the chemical reactions comprising forming bonds resulting, for example, in chain extension and/or crosslinking of polymer chains. In particular the term "curable adhesive" refers to reactive adhesive compositions, which can still be cured by initiation of the curing reactions. These types of curable adhesives are mechanically deformable above the $T_g$ of the adhesive composition.

Preferably, the curable adhesive has a crosslinking degree of 0%. The term "crosslinking degree" refers in the present disclosure to a proportion of the component, which is insoluble in boiling xylene. The percentage of insoluble proportion can be determined by refluxing a test specimen in boiling xylene, weighting the dried residue and making suitable corrections for other soluble and insoluble components present in the tested composition. Preferably, the crosslinking degree is measured by using a method as defined ISO 10147 standard.

The curable adhesive contained in the composition of the present invention comprises:

a) At least one epoxy resin and b) At least one epoxy resin modified acrylonitrile-butadiene copolymer.

Preferably, the curable adhesive has a glass transition temperature ($T_g$) in the range of 20-105° C., more preferably 23-95° C., even more preferably 30-85° C., still more preferably 35-80° C., in particular 40-80° C. This enables storing of the composition in a deformed temporary shape at normal room temperatures or somewhat below normal room temperature.

Preferable epoxy resins are solid resins having more than one epoxy group per molecule. Mixtures of solid and liquid epoxy resins may also be preferable. The term "solid epoxy resin" is well known to the person skilled in the art and it is used as opposed to "liquid epoxy resin". The glass transition temperature ($T_g$) of solid epoxy resins is above room temperature.

Preferred solid epoxy resins have the following formula (I).

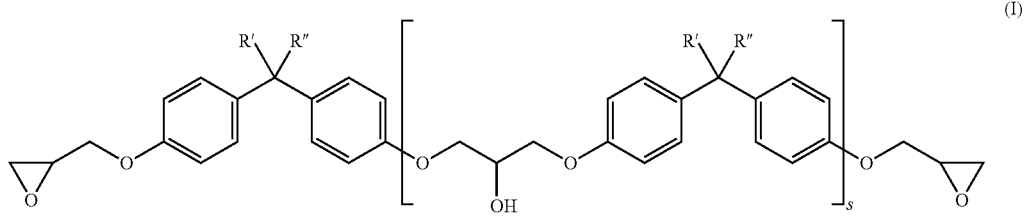

Here, the substituents R' and R" represent independently from one another either H or $CH_3$. Furthermore, the index s represents a value of 1, in particular of 1.5, more preferably of 2 to 12.

Suitable solid epoxy resins are commercially available, for example, from Dow Chemical Company, from Huntsman International LLC, or from Hexion Specialty Chemicals Inc.

Preferred liquid epoxy resins, which, in particular, can be used together with a solid epoxy resin, have the following formula (II).

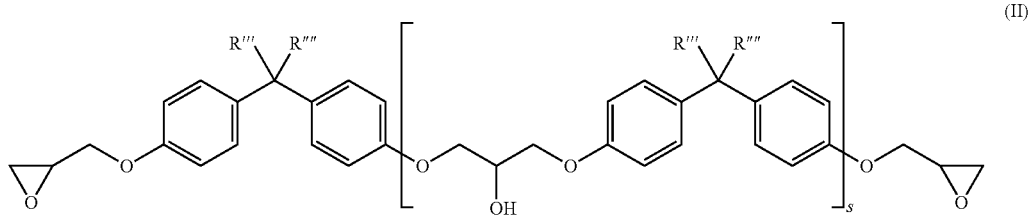

Here, the substituents R' and R" represent independent from one another either H or CH$_3$. Furthermore, the index r represents a value of 0 to 1. Preferably, r represents a value ≤0.2.

Preferable these are diglycidyl ethers of bisphenol A (DGEBA), of bisphenol F and of bisphenol NF. Here, the term "NF" refers to a mixture of acetone with formaldehyde, which is used as starting material in its production. Suitable liquid resins are commercially available, for example, under the trade names Araldite® GY 250, Araldite® PY 304, and Araldite® GY 282 from Huntsman International LLC, or under the trade names of D.E.R.® 331 or D.E.R.® 330 from Dow Chemical Company, or under the trade name of Epikote® 828 or Epikote® 862 from Hexion Specialty Chemicals Inc.

Further suitable epoxy resins are so-called novolacs. In particular, they have the following formula (III).

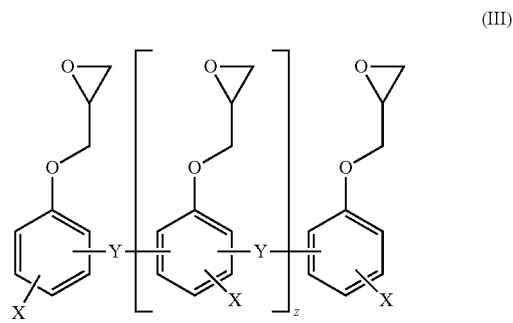

Here, the moiety X represents a hydrogen atom or a methyl group. The moiety Y represents —CH$_2$— or a moiety of the formula (IV).

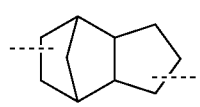

Furthermore, the index z represents a value of 0 to 7, in particular a value of 3. In particular, these are phenol or cresol novolacs (Y represents —CH$_2$—). Such epoxy resins are commercially available, for example, under the trade name of EPN® or EON® and Tactix® 556 from Huntsman International, LLC or under the product series D.E.N® from Dow Chemical Company.

According to one or more embodiments, the composition comprises the at least one epoxy resin in an amount of 20-70 wt.-%, preferably 25-65 wt.-%, more preferably 25-60 wt.-%, most preferably 30-45 wt.-%, based on the total weight of the composition. Compositions comprising the at least one epoxy resin in an amount falling within the above cited ranges have been found out to provide high shape recovery rates based on a thermally induced shape memory effect combined with excellent mechanical properties of the cured composition.

Preferably, the curable adhesive comprises at least one solid epoxy resin of the formula (I). According to one or more embodiments, the curable adhesive comprises at least one solid epoxy resin of the formula (I) and at least one liquid epoxy resin of the formula (II). According to a further preferred embodiment, the composition comprises at least one solid epoxy resin of the formula (I) and at least one novolac type epoxy resin of the formula (III). The weight ratio of the total amount of the at least one solid epoxy resin of the formula (I) and the total amount of the at least one novolac type epoxy resin of the formula (III) is preferably in the range from 20:1 to 1:5, more preferably from 20:1 to 1:1, most preferably from 15:1 to 3:1. According to a still further preferred embodiment, the composition comprises at least one solid epoxy resin of the formula (I), at least one liquid epoxy resin of the formula (II), and at least one novolac type epoxy resin of the formula (III).

Preferably, the composition comprises the at least one epoxy resin modified acrylonitrile-butadiene copolymer in an amount of 1.0-30.0 wt.-%, more preferably 2.5-25.0 wt.-%, even more preferably 5.0-20.0 wt.-%, most preferably 5.0-15.0 wt.-%, based on the total weight of the composition. Compositions comprising the at least one epoxy resin modified acrylonitrile-butadiene copolymer in an amount falling within the above cited ranges have been found out to provide high shape recovery rates based on a thermally induced shape memory effect combined with excellent mechanical properties of the cured composition.

Epoxy resin modified acrylonitrile-butadiene copolymers are known to a person skilled in the art. For example, they can be produced by reacting carboxy- or epoxy-terminated acrylonitrile-butadiene copolymers, also known as liquid rubbers, with polyepoxides and/or polyphenols. Preferably, the at least one epoxy resin modified acrylonitrile-butadiene copolymer is obtained by reacting one or more carboxyl-terminated butadiene-acrylonitrile copolymers (CTBN) with one or more solid epoxy resins of the formula (I) and/or one or more liquid epoxy resin of the formula (II) and/or one or more novolac type epoxy resin of the formula (III).

Suitable epoxy resin modified acrylonitrile-butadiene copolymers are commercially available, for example, under the trade name of Struktol® from Schill & Seilacher Gruppe, Germany, such as Struktol® 3604, Struktol® 3606, Struktol® 3611, Struktol® 3614, Struktol® 3654, and Struktol® 3656. Suitable epoxy resin modified acrylonitrile-butadiene copolymers also include the mixtures of polymers disclosed in U.S. Pat. No. 9,796,809 B2 as "impact strength improving agents for epoxy resin compositions".

According to one or more embodiments, the at least one epoxy resin modified acrylonitrile-butadiene copolymer comprises 5-50 wt.-%, preferably 10-45 wt.-%, more preferably 20-40 wt.-%, most preferably 15-30 wt.-%, of at least one acrylonitrile-butadiene rubber, based on the weight of the at least one epoxy resin modified acrylonitrile-butadiene copolymer.

The amount of acrylonitrile contained in the at least one acrylonitrile-butadiene rubber is not particularly restricted. It may be preferable that the at least one acrylonitrile-butadiene rubber comprises not more than 40 wt.-%, more preferably not more than 35 wt.-%, most preferably not more than 30 wt.-%, of acrylonitrile, based on the total weight of the at least one acrylonitrile-butadiene rubber. Preferably, the at least one acrylonitrile-butadiene rubber is a carboxyl-terminated acrylonitrile-butadiene rubber.

It may be preferable that the composition comprises the at least one acrylonitrile-butadiene rubber in a total amount of 0.5-15.0 wt.-%, more preferably 1.0-10.0 wt.-%, even more preferably 1.5-7.5 wt.-%, most preferably 1.5-5.0 wt.-%, based on the total weight of the composition.

According to one or more embodiments, the curable adhesive is a thermally curable adhesive, preferably a thermally curable structural adhesive.

The term "structural adhesive" refers in the present disclosure to adhesives, which can be used in a structure having structural integrity that is maintained with both welded joints and adhesive bonds made using the structural adhesive or with such adhesive bonds only. Structural adhesives are commonly used, for example, in the automotive industry. The term "thermally curable adhesive" refers to adhesives, in which the curing reaction is initiated by increasing the temperature of the adhesive (above the curing temperature). Such adhesives are known to a person skilled in the art and they typically contain one or more heat-activatable curing agents and optionally one or more accelerators for the curing agents. Preferably, the thermally curable adhesive has an activation temperature, i.e. a curing temperature, in the range of from 120 to 220° C., more preferably from 160 to 200° C.

In case the composition is used as a shape memory material, the composition should not be heated above the activation temperature of the curable adhesive during the deforming and shape recovery steps since a fully cured adhesive would no longer be mechanically deformable. It may be preferable that the activation temperature of the thermally curable adhesive is at least 10° C., preferable at least 20° C. above the melting temperature ($T_m$) of the at least one thermoplastic elastomer.

According to one or more embodiments, the curable adhesive further comprises:

c) At least one curing agent for epoxy resins and d) Optionally at least one accelerator for the at least one curing agent.

Preferably, the at least curing agent is activated by elevated temperature. Suitable curing agents for epoxy resins include, for example, dicyandiamide, guanamine, guanidine, amino guanidine and derivatives thereof; substituted ureas, in particular 3-(3-chloro-4-methylphenyl)-1,1-dimethyl urea (Chlortoluron), or phenyl-dimethyl-ureas, in particular p-chlorophenyl-N,N-dimethyl-urea (Monuron), 3-phenyl-1,1-dimethyl-urea (Fenuron), 3,4-dichlorophenyl-N,N-dimethyl-urea (Diuron), and imidazoles and amine complexes. Especially preferred curing agent is dicyandiamide, in particular in combination with a suitable accelerator, in particular a substituted urea.

Preferably, the curable adhesive comprises the at least one curing agent for epoxy resins in an amount of 0.05-5.0 wt.-%, more preferably 0.1-4.0 wt.-%, most preferably 0.5-2.5 wt.-%, based on the total weight of the curable adhesive.

The composition can further comprise additional constituents (auxiliaries) which are customary for curable structural adhesives. Examples of suitable auxiliaries include fillers, UV absorbers, UV and heat stabilizers, antioxidants, flame retardants, pigments, dyes, thixotropic set-up agents such as aerosols and nanoclays, and reactive diluents.

According to one or more embodiments, the composition comprises at least one solid particulate filler. It may be preferable that the solid particular filler is selected from the group consisting of mica, talc, kaolin, wollastonite, feldspar, chlorite, bentonite, montmorillonite, calcium carbonate (precipitated or ground), dolomite, quartz, silica (pyrogenic or precipitated), cristobalite, calcium oxide, aluminum hydroxide, magnesium oxide, hollow ceramic spheres, hollow glass spheres, hollow organic spheres, glass spheres, and functionalized alumoxanes. Preferred solid particulate fillers include both organically coated and also uncoated commercially available forms of the fillers included in the above presented list.

The at least one solid particulate filler is preferably in the form of finely divided particles. The term "finely divided particles" refers to particles, whose median particle size $d_{50}$ does not exceed 500 µm. The term median particle size $d_{50}$ refers to a particle size below which 50% of all particles by volume are smaller than the $d_{50}$ value.

The amount of solid particulate fillers contained in the composition is not particularly restricted. It may be preferable that the composition comprises the at least one solid particulate filler in an amount of 1.0-30.0 wt.-%, more preferably 2.5-25.0 wt.-%, even more preferably 5.0-25.0 wt.-%, most preferably 7.5.0-20.0 wt.-%, based on the total weight of the composition.

According to one or more embodiments, the composition comprises at least fiber filler selected from the group consisting of inorganic fibers, such as glass fibers, aramid fibers, wollastonite fibers, carbon fibers, and Kevlar fibers, and organic fibers. Inorganic fibers, which have been surface treated, for example, with silanes, may also be used. Compositions including at least one fiber filler have been found to provide excellent mechanical properties, in particular high lap shear strength after curing of the curable adhesive. The fiber filler may be a mixture of fibers having different shapes and sizes. Preferably, the at least one fiber filler is an inorganic fiber, in particular an inorganic fiber selected from the group consisting of glass fibers, aramid fibers, wollastonite fibers, and carbon fibers.

According to one or more embodiments, the composition comprises the at least one fiber filler in an amount of 0.5-20.0 wt.-%, more preferably 1.0-15.0 wt.-%, even more preferably 2.5-12.5 wt.-%, most preferably 2.5-10.0 wt.-%, based on the total weight of the composition. The at least on fiber-based filler may have a number average length of 1.0-10.0 mm, preferably 1.5-7.5 mm, most preferably 2.5-5.0 mm and/or a number average diameter of 5-50 µm, preferably 7.5-30 µm, most preferably 10-25 µm. According to one or more preferred embodiments, the composition comprises 0.5-20.0 wt.-%, preferably 2.5-10.0 wt.-%, based on the total weight of the composition, of at least one inorganic fiber filler, preferably glass fibers.

The composition may further comprise one or more chemical or physical blowing agents. According to one or more embodiments, the composition is essentially free of chemical or physical blowing agents.

The composition of the present invention is a storage stable composition. The term "storage stable" refers in the present disclosure to compositions, which can be stored at specified storage conditions for long periods of time, such as at least one month, in particular at least 3 months, without any significant changes in the application properties and reactivity of the composition. The "typical storage conditions" refer here to temperatures of not more than 60° C., in particular not more than 50° C.

The composition of the present invention is a one-part composition, i.e. a composition in which all the constituents are contained as one single part (component). One-part compositions can be provided packaged in a single compartment or package whereas in case of two-part or multi-part compositions, the components are provided packaged in physically separated compartments or in separate packages.

When preparing the composition according to the present invention, the curable adhesive is mixed with the at least one thermoplastic elastomer at a temperature, which is above the glass transition temperature ($T_g$) of the curable adhesive, until a homogenous mixture is obtained. Preferably, the mixing of the curable adhesive with the thermoplastic elastomer is conducted at a temperature, which is above the melting temperature ($T_m$) of the at least one thermoplastic elastomer. In case the composition comprises multiple thermoplastic elastomers, the mixing is preferably conducted at a temperature above the melting temperature of the thermoplastic elastomer having the highest melting temperature. The mixing of the ingredients can be conducted using any conventional mixing apparatus, such as a kneader or continuous-type mixing apparatus, such as a single- or twin-screw extruder.

In case the curable adhesive is a thermally curable adhesive, it may be advantageous that the curing agent(s) is added to the composition after mixing of all other ingredients. In this case, the first mixing step can be conducted at or even above the activation temperature of the curable adhesive. This may be advantageous since a more efficient mixing is typically obtained at higher temperatures.

Another subject of the present invention is an expandable article composed of the composition according to the present invention, wherein the at least one thermoplastic elastomer is in a compressed state. The at least on thermoplastic elastomer can be brought from a relaxed (non-strained) state into a compressed (strained) state by mechanically deforming, in particular by compressing, the composition at a temperature above the glass transition temperature of the curable adhesive. Consequently, the term "compressed state" is understood to mean that the thermoplastic elastomer contained in the composition is in a strained state, into which it has been brought by subjecting the composition to a mechanical deformation performed by compressing the composition at a temperature above the glass transition temperature of the curable adhesive.

The expandable article of the present invention is dimensionally stable at temperatures below the glass transition temperature ($T_g$) of the curable adhesive and it can be subjected to further processing, for example, punching or cutting. At temperatures above the $T_g$ of the curable adhesive, the dimensional stability is lost since the thermoplastic elastomer is able to return from its compressed state to a relaxed state, which results in expansion of the composition.

The expandable article is preferably obtainable by subjecting a composition of the present invention to a reversible deforming process comprising steps of:

i) Providing a composition according to the present invention in an original shape, in which the at least one thermoplastic elastomer is in a relaxed state, ii) Heating the composition in its original shape to a temperature, which is above the glass transition temperature ($T_g$) of the curable adhesive and below the melting temperature ($T_m$) of the at least one thermoplastic elastomer, iii) Mechanically deforming the heated composition from its original shape to a different temporary shape, in which the at least thermoplastic elastomer is in a compressed state, and iv) Cooling the composition in its temporary shape to a temperature below the glass transition temperature ($T_g$) of the curable adhesive.

Preferably, in step iii) the composition is mechanically deformed under tension of the at least on thermoplastic elastomer. The term "under tension" is understood to mean that the deformation is conducted against the resistance of the at least one thermoplastic elastomer. In order to allow the mechanical deformation of the composition under tension of the thermoplastic elastomer, the composition has to be deformable and the thermoplastic elastomer has to have elastic properties. Consequently, in step ii) the composition is heated to a temperature, which is above $T_g$ or the curable adhesive and below the $T_m$ of the thermoplastic elastomer. In case the composition comprises one or more thermoplastic elastomers, the mechanical deforming step should be conducted below the melting temperature of the thermoplastic elastomer having the lowest $T_m$.

In case the curable adhesive is a thermally curable adhesive, the temperature to which the composition is heated in step ii) should be below the curing temperature of the curable adhesive. Otherwise the composition could not be deformed in the subsequent step iii). Preferably, the temperature of the composition during the reversible deforming process should be kept at least 10° C., preferably at least 20° C., below the curing temperature of the thermally curable adhesive.

The step iii) is preferably conducted by compressing the heated composition obtained from step ii). The composition can be compressed, for example, by applying an external force acting along at least one axis of the composition in its original shape. The compressing can be conducted by using any conventional means known by a person skilled in the art such as by pressing or rolling. In step iv), the temporary shape of the composition is fixed by cooling the composition in its temporary shape below the glass transition temperature of the curable adhesive. Preferably, in step iv), the composition is held in its temporary shape until the composition has been cooled below the glass transition temperature of the curable adhesive.

Due to the properties of the composition of the present invention, the mechanical deforming conducted in step iii) typically results in shrinking of the composition in at least one dimension and expansion of the composition in at least one other dimension. For example, in case the external force is applied along the vertical axis of the composition in its original shape, the temporary shape typically has reduced height and increased width/length/diameter. The degree of deformation is not particularly restricted in the present invention. According to one or more embodiments, at least one dimension of the composition in its temporary shape is at least 25% lower, preferably at least 35% lower, than the corresponding dimension in the original shape. Preferably, the dimension of the composition in the temporary shape corresponding to the main direction of the external force applied on the composition in step iii) is at least 25% lower, preferably at least 35% lower, than the corresponding dimension in the original shape.

The composition of the expandable article can be returned from the fixed temporary shape back to the original shape by reversing the steps of the reversible deforming process. In such reversed deforming process, the composition in its temporary shape is first heated to a temperature above the glass transition temperature ($T_g$) of the curable adhesive. This enables the at least one thermoplastic elastomer to gain its original relaxed configuration, which brings the composition from the temporary shape to the original shape. Finally, the temperature of the composition can be lowered under the $T_g$ of the curable adhesive.

Preferably, the expandable article has a shape recovery rate based on a thermally induced shape memory effect of at least 50%, more preferably at least 75%, even more preferably at least 85%, most preferably at least 95%, wherein the shape recovery rate is defined as ratio of the recovered shape change and deformed shape change as described above.

Another subject of the present invention is a method for producing an expandable article of the present invention, wherein the method comprises the steps i) to iv) of the reversible deforming process as describe above.

FIG. 1 shows a schematic presentation of the method for producing an expandable article of the present invention.

In the first stage (Z1), the composition has been provided in an original state (1), in which the at least one thermoplastic elastomer is in a relaxed state and the temperature of the composition is below the glass transition temperature ($T_g$) of the curable adhesive. In this stage the composition is in an original shape into which it was formed, for example, during production of the composition.

In the second stage (Z2), the composition has been heated by $\Delta T_1$ to a temperature, which is above the $T_g$ of the curable adhesive and below the melting temperature ($T_m$) of the at least one thermoplastic elastomer. In this stage the composition is still in the original shape but since the temperature has been increased above the $T_g$ of the curable adhesive, the composition is in a deformable original state (1').

In the third stage (Z3), an external force F has been applied on the composition to deform the composition to a temporary shape. In this stage the at least on thermoplastic elastomer contained in the composition is in a compressed state. Since the temperature is still above the $T_g$ of the curable adhesive, the composition is in a deformable temporary state (2).

In the fourth stage (Z4), the composition has been cooled by $\Delta T_1$ to a temperature, which is below the $T_g$ of the curable adhesive. This results in fixing of the temporary shape of the composition. In this stage the at least on thermoplastic elastomer contained in the composition is in a compressed state. Since the temperature of the composition is below the $T_g$ of the curable adhesive the composition is no longer deformable and is in a fixed temporary state (3). It is essential that the temperature is lowered below the $T_g$ of the curable adhesive while the composition is being held in its temporary shape. The composition in its fixed temporary state (3) is dimensionally stable and it can be subjected to further mechanical processing steps such as cutting or punching. In FIGS. 3-6 the expandable article of the present invention is referred with the same reference number "3" since it is composed of the composition in its fixed temporary state.

The temperature changes in stages Z2 and Z4 do not have to have identical values even though they have been presented as such in FIG. 1. For example, in temperature of the composition in stage Z4 can be lower than temperature of the composition in stage Z1.

Another subject of the present invention is a use of the expandable article of the present invention as a reinforcing element for reinforcing cavities of structural elements.

The use as a reinforcing element typically comprises steps of providing the expandable article attached to a support to form a reinforcing element, heating the expandable article to a temperature, which is above the glass transition temperature ($T_g$) of the curable adhesive, and curing of the curable adhesive.

Figure 2:
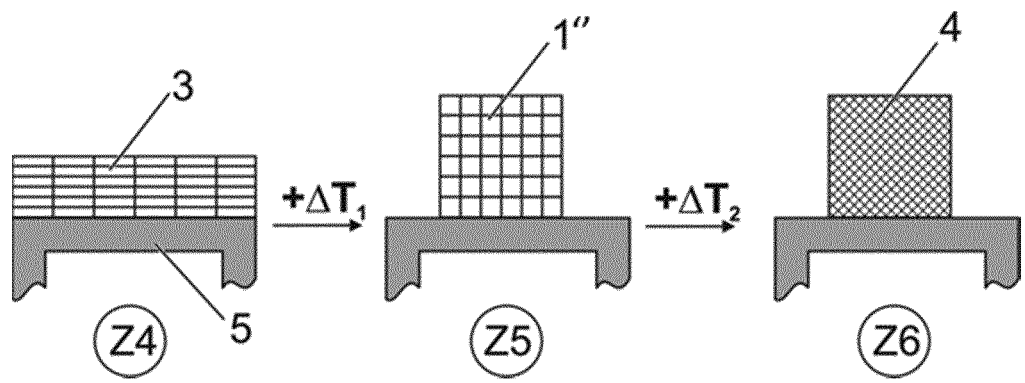
FIG. 2 shows a schematic presentation of the use of the expandable article of the present invention as a reinforcing element.

FIG. 2 shows a schematic presentation of the use of the expandable article of the present invention as a reinforcing element.

In the first stage (Z4), the expandable article composed of the composition in a fixed temporary state (3) has been provided attached to a support (5). The temperature of the composition in this stage is below the glass transition temperature ($T_g$) of the curable adhesive.

In the second stage (Z5), the composition has been heated by $\Delta T_1$ to a temperature, which is above the $T_g$ of the curable adhesive and below the melting temperature ($T_m$) of the at least one thermoplastic elastomer. Increasing the temperature above the $T_g$ of the curable adhesive allows the composition to return from the fixed temporary state (3) to the recovered original state (1'') as the at least one thermoplastic elastomer regains its original relaxed configuration. In case of 100% shape recovery rate, the shape of the composition in the recovered original state (1'') is identical with the shape of the composition in the original state (1).

In the third stage (Z6), the composition in its recovered original state (1'') has been cured. In case the curable adhesive contained in the composition is a thermally curable adhesive, the curing can be conducted by heating the composition by $\Delta T_2$ to a temperature, which is above the curing temperature of the curable adhesive. After the curing of the curable adhesive, the composition is in a cured original state (4). In this state the composition is no longer deformable at any temperatures and it cannot, therefore, be used for producing the expandable article of the present invention. The shape of the composition in its cured original state (4) is typically essentially identical with the shape of the composition in the recovered original state (1'').

Another subject of the present invention is a reinforcing element for reinforcing cavities of structural elements, the reinforcing element comprising a support and an expandable article according to the present invention, which is indirectly or directly attached to a surface of the support. In addition to its function as a support for the expandable article, the support can also itself contribute to the structural reinforcing, sealing, or noise reduction of the structural element.

This support can be composed of any materials. In particular, the support may consist of a plastic, a metal, or of a combination of a plastic and a metal. It may be advantageous that the support is made of a fiber-reinforced plastic (FRP), in particular of a plastic reinforced with inorganic fibers, such as glass fibers, aramid fibers, carbon fibers, or basalt fibers. Preferred plastics include polyurethanes, polyamides, polyesters and polyolefins and polyolefin copolymers, in particular, high temperature-resistant polymers such as poly (phenylene ethers), polysulfones, and polyethersulfones. Preferred metals include aluminum, steel, nickel, and alloys thereof. Furthermore, the metal can be present in the support in an untreated form or it can be pre-treated with suitable agents, for example, to prevent corrosion or to improve the adhesion.

Preferred plastics include polyamides (PA) such as PA6 or PA66, polyethylene polypropylene, polystyrene, and copolymers such as acrylonitrile butadiene styrene (ABS), in particular when reinforced with inorganic fibers, preferably with at least one of glass fibers, aramid fibers, carbon fibers, and basalt fibers. According to one or more embodiments, the support is composed of fiber reinforced polyamide (PA) comprising 10-40 wt.-%, preferably 25-35 wt.-% of glass fibers, based on the total weight of the support.

Furthermore, the support can, for example, be solid, hollow or foamed or have a latticed structure. Typically, the surface of the support can be smooth, rough or structured.

Furthermore, the support can have at least one fastening means, in particular a clip, to fasten and place the reinforcement element in a cavity. The fastening of the reinforcement element with a clip is in particular suitable for applications, in which the entire surface of the structural element, for example the inner surface of a cavity, has to be left freely accessible for dip coating. In such cases, a fastening of the support by means of gluing is not suitable since the layer of adhesive would cover the surface to be coated.

According to one or more embodiments, the support consists of a plastic reinforced with inorganic fibers, which is optionally coated with a metal. Here, the above described materials are preferred as a plastic and a metal. The metal, with which the plastic is coated, can be attached to the plastic in any manner. The fastening is done, for example, by mechanic means of fastening such as nails, screws, rivets, mechanic clips, clamps, flanges and the like, or by bonding of the metal and the plastic. Furthermore, the metal could also have been applied to the plastic by means of plastic galvanization. Preferably, the layer thickness of the metal layer on the plastic support is in the range of 0.03-1.5 mm.

The support made of plastic, which is coated with a metal, has the advantage compared to a strictly metal support that it is on one hand lighter, and on the other hand, it can be varied very widely in its mechanic properties and its de-sign due to the properties of the plastic and the selection of the material and its processing. The advantage of the metal coating compared to a strictly plastic support is the fact that the metals usually adhere more easily. Another ad-vantage of the metal coating is the fact that in case of thermally curable adhesives the metal layer may be heated by means of induction very locally and efficiently.

Figure 3:
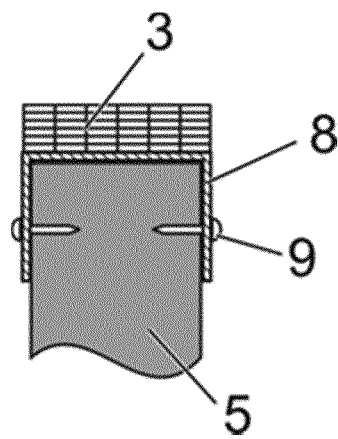
FIG. 3 shows a reinforcing element according to one embodiment of the present invention.

FIG. 3 shows a reinforcing element according to one embodiment of the present invention. The reinforcing element comprises a support (5), a metal coating (8) attached to the support (5) by use of nails (9), and an expandable article attached to the surface of the metal coating (8). The expandable article is composed of the composition of the present invention in the fixed temporary state (3), in which the at least thermoplastic elastomer contained in the composition is in a compressed state.

Another subject of the present invention is a method for reinforcing cavities of structural components, the method comprising steps of:

i') Placing a reinforcement element according to the present invention in a cavity of a structural component, ii') Heating the expandable article to a temperature above the glass transition temperature ($T_g$) of the curable adhesive, and iii') Curing of the curable adhesive.

In the first step i'), the reinforcing element comprising a support and an expandable article of the present invention is placed into a cavity of a structural component. The temperature of the reinforcing element is below the glass transition temperature $T_g$ in order to keep the composition in the temporary (deformed) shape. Typically, the reinforcing element is provided with such dimensions that once it is placed in the cavity, a gap exists between the expandable article and the inner wall of the cavity.

The structural component to be reinforced is preferably used in bodies and/or frames of vehicles and means of transportation, in particular of water, land or air vehicles. Most preferably, the structural component to be reinforced is used in bodies or frames of automotive vehicles, trucks, railroad wagons, boats, ships, helicopters and airplanes, most preferably in automotive vehicles.

In the second step ii'), the temperature of the expandable article is heated above the $T_g$ of the curable adhesive, which causes the composition to expand as the at least one thermoplastic elastomer returns from the compressed state to the relaxed state. Preferably, the direction and rate of the expansion are such that the gap originally present between the inner wall of the cavity and the outer surface of the expandable article is completely closed. It is also preferable that the expanded composition adheres to the inner wall of the cavity to enable effective sealing of the cavity.

The heating of the expandable article can be conducted using any conventional means. According one or more embodiments of the method for reinforcing cavities of structural components, the support of the reinforcement element is made of an inductively heatable metal or a material, which is coated by an inductively heatable metal. In these embodiments, step ii') is conducted by induction heating, that is, by means of an electromagnetic alternating field of an induction coil.

In the third step iii'), the curable adhesive is cured in order to increase the mechanical strength of the expanded composition, which results in improved reinforcing effect. Preferably, the curable adhesive is cured by heating. According to one or more embodiments of the method for reinforcing cavities of structural components, the support of the reinforcement element is made of an inductively heatable metal or a material, which is coated by an inductively heatable metal. In these embodiments, the step iii') is conducted by induction heating, that is, by means of an electromagnetic alternating field of an induction coil.

Figure 4:
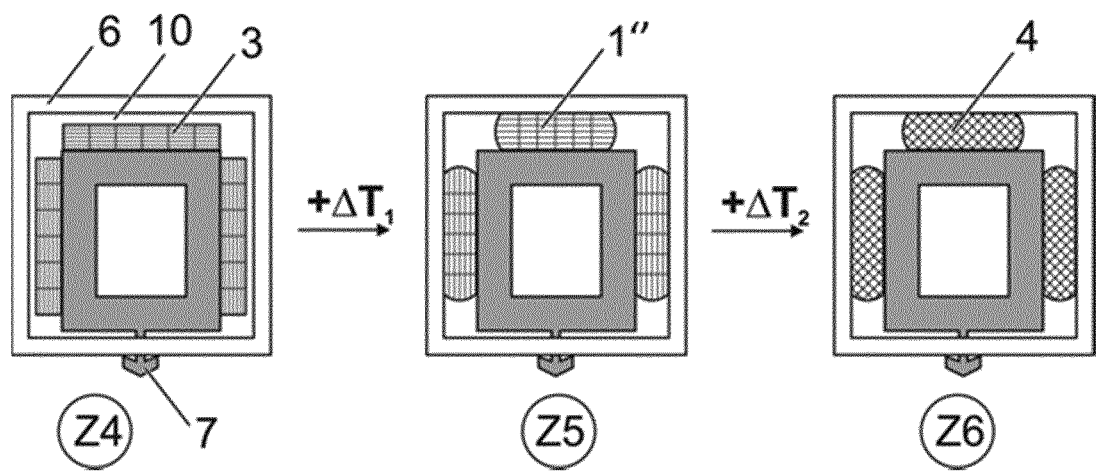
FIG. 4 shows a schematic presentation of one embodiment of the method for reinforcing cavities of structural element.

FIG. 4 shows a schematic presentation of one embodiment of the method for reinforcing cavities of structural element.

In the first stage (Z4), a reinforcing element composed of a support (5) and several expandable articles of the present invention has been provided placed in a cavity of a structural component (6). The expandable articles are composed of the composition of the present invention in the fixed temporary state (3), in which the at least thermoplastic elastomer contained in the composition is in a compressed state. The initial temperature ($T_0$) of the expandable articles in this stage is below the glass transition temperature $T_g$ of the curable adhesive. In this embodiment of the method, the support (5) of the reinforcing element has been attached to the structural component (6) with a clip (7).

In the second stage (Z5), the expandable articles has been heated by $\Delta T_1$ to a transformation temperature ($T_{trans}$), which is above the $T_g$ of the curable adhesive and below the melting temperature ($T_m$) of the at least one thermoplastic elastomer. As soon as the temperature of the expandable articles exceeds the $T_g$ the curable adhesive, the articles start to expand as the compositions return from the fixed temporary state (3) to the recovered original state (1"). Due to the expansion of the compositions the open gap (10) originally present between the inner wall of the structural component (6) and the outer surface of the expandable articles has been completely closed.

In the third stage (Z6), the temperature of the expandable articles has been further increased by $\Delta T_2$ to a final temperature ($T_F$), which results curing of the curable adhesive. In this stage, the compositions are in cured original state (4), in which the compositions are no longer deformable at any temperatures.

The first and second temperature increases ($\Delta T_1$, $\Delta T_2$) of steps ii') and iii') can also be conducted in one single step, in which the temperature of the expandable articles is steadily increased from the initial temperature $T_0$ to the final temperature $T_F$. However, in this case the speed of temperature increase has to be selected such the at least one thermoplastic elastomer is able to return from the compressed state to the relaxed state before the temperature of the reinforcing element exceeds the $T_m$ of the at least one thermoplastic elastomer.

Figure 5:
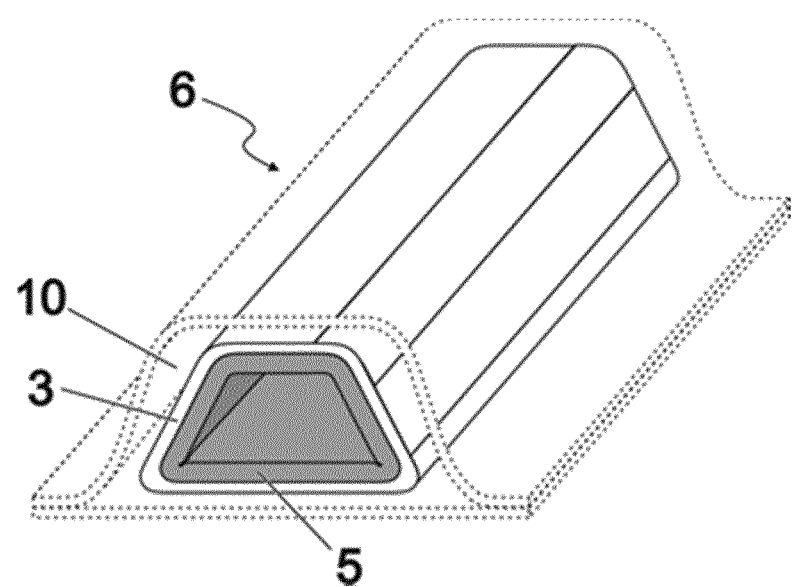
FIG. 5 shows a reinforcing element of the present invention placed in a cavity of a structural component.

FIG. 5 shows a reinforcing element of the present invention placed in a cavity (10) of a structural component (6) before the temperature has been increased above the $T_g$ of the curable adhesive. The reinforcing element comprises an expandable article composed of the composition of the present invention in its fixed temporary state (3) attached on a support (5).

Figure 6:
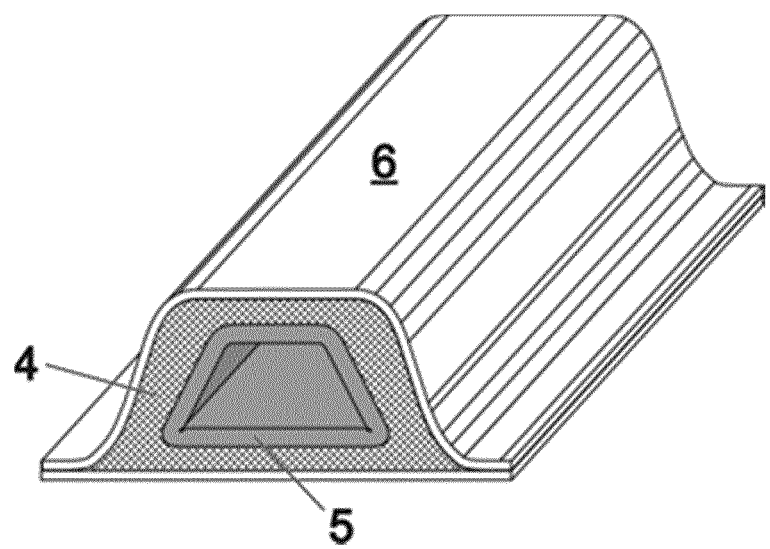
FIG. 6 shows a reinforced cavity of a structural component obtained by increasing the temperature of the reinforcing element in the arrangement of FIG. 5 above the glass transition temperature of the curable adhesive followed by subsequent curing of the adhesive.

FIG. 6 shows a reinforced cavity of a structural component (6) obtained by increasing the temperature of the expandable article in the arrangement of FIG. 5 above the glass transition temperature of the curable adhesive and by subsequent curing of the adhesive. The reinforced cavity comprises a composition of the present invention in its cured original state (4), which completely fills the space between the support (5) and the inner wall of the structural component (6). The shape and structure of the reinforcing elements according to the present invention can be selected as desired based on the type of the cavity of a structural component to be reinforced.

Still another subject of the present invention is use of the composition according to the present invention as a shape memory material.

The use as a shape memory material may comprise steps of providing the composition of the present invention in an original shape, mechanically deforming the composition to a different temporary shape under the tension of the at least on thermoplastic elastomer, fixing in the composition to the deformed temporary shape, and inducing a shape recovery from the temporary shape to the original shape. The original shape is also known as "permanent", "memorized" or "programmed shape" of the composition.

In particular, the use as a shape memory material can comprise steps of:

i") Providing a composition according to the present invention in an original shape, in which the at least one thermoplastic elastomer is in a relaxed state, ii") Heating the composition in its original shape to a temperature above the glass transition temperature ($T_g$) of the curable adhesive and below the melting temperature ($T_m$) of the at least one thermoplastic elastomer, iii") Mechanically deforming the heated composition from its original shape to a different temporary shape, in which the at least thermoplastic elastomer is in a strained state, and iv") Cooling the composition in its temporary shape to a temperature below the glass transition temperature ($T_g$) of the curable adhesive.

v") Increasing the temperature composition obtained from step iii") above the glass transition temperature of the curable adhesive to allow the at least one thermoplastic elastomer to return from the strained state back to the relaxed state.

Depending on the desired shape memory effect, the composition can be subjected to compression or elongation in step iii"). In the first case, the deformed composition expands whereas in the latter case, the deformed composition contracts when the temperature increases above the $T_g$ of the curable adhesive.

In case the curable adhesive is a thermally curable adhesive, the temperature to which the composition is heated in step ii") should be below the curing temperature of the curable adhesive. Preferably, the temperature of the composition during step ii") should be kept at least 10° C., preferably at least 20° C., below the curing temperature of the thermally curable adhesive. In case the composition comprises one or more thermoplastic elastomers, the temperature of the composition during step ii") should be below the melting temperature ($T_m$) of the thermoplastic elastomer having the lowest $T_m$.

The mechanical deformation step iii") is preferably conducted by applying an external force acting upon at least one axis of the composition in its original shape. This type of mechanical deformation can be conducted using any conventional means known by a person skilled in the art. It is essential that in step iii) the composition is deformed under tension of the at least on thermoplastic elastomer and that in step iv"), the composition is held in its temporary shape until the composition has been cooled below the glass transition temperature of the curable adhesive.

Examples

The followings products shown in Table 1 were used in the examples.

TABLE 1

| Araldite GT 7004 | Medium molecular weight solid epoxy resin | Huntsman LLC |
|---|---|---|
| DEN 431 | Epoxy Novolac resin | Dow Chemical Company |
| Toughening agent | Epoxy resin modified acrylonitrile-butadiene copolymer containing 15-35 wt.-% of Hycar ® 1300X13 | |
| Engage 8450 | Polyolefin elastomer | Dow Chemical Company |
| CS 7938 | Glass fibers, nom. diameter 3 mm | Lanxess GmbH |
| HDK H18 | Pyrogenic silica | Wacker Chemie AG |
| Talk ST60 | Talc | Imerys Group |
| Scotchlite S60 | Glass bubbles | 3M Advanced Materials |
| Omyacarb 5GU | Calcium carbonate | Bassermann minerals GmbH |
| Marcus Wax M200 | Polyethylene wax | Marcus Oil & Chemical, USA |
| Dyhard SF100 | Dicyandiamide | AlzChem GmbH |
| Dyhard UR700 | Hardening accelerator | AlzChem GmbH |

The toughening agent used in the exemplary compositions was prepared by following a similar procedure as used for preparation of the polymers P1 to P6 disclosed in the U.S. Pat. No. 9,796,809 B2 ("Examples").

Preparation of Test Specimens

The compositions containing the ingredients in the amounts as shown in Table 2 were first produced in a twin-screw extruder at temperature above the melting temperature of the thermoplastic elastomer (Engage 8450) and below the activation temperature of the curing agent (Dyhard SF100) and accelerator (Dyhard UR700). Test specimens having a rectangular shape and thickness of 7 mm (original shape) were then formed from the extruded compositions by molding. The molding process was conducted at a temperature of ca. 100° C.

The produced test specimens in their original shape were cooled and stored at normal room temperature (ca. 23° C.).

Recovery Rate

Each test specimen was first subjected to a reversible deformation process. In the deformations process, the test specimen in its original shape was heated to a temperature of 80° C., mechanically deformed by pressing to decrease the thickness of the test specimen to 4 mm (temporary shape), and cooled to a normal room temperature (ca. 23° C.). The pressing force was released only after the temperature of the compressed test specimen had decreased below 40° C. in order to fix the compressed test specimen to its temporary shape.

The compressed test specimen was then heated to temperature of 80° C., which was over the glass transition temperature of the curable adhesive. At this temperature the thermoplastic elastomer contained in the composition was able to return from its strained state to a relaxed state, which caused the composition to expand in direction opposite to the direction of pressing force applied in the deformation step. The heating was then continued until the activation temperature of the curing agent was reached and the curable adhesive was cured at a temperature of 180° C. After the curing reaction was completed, the thickness of the test specimen was again measured (cured shape) and the recovery was calculated as:

$$\text{Recovery rate} = \frac{(H_C - H_T)}{(H_O - H_T)} \cdot 100\%,$$

wherein $H_C$ is the thickness of the test specimen after expansion and curing, $H_T$ is the thickness in the temporary shape, and $H_O$ is the thickness in the original shape.

The recovery rates presented in Table 2 have been obtained as an average value of three measurements conducted with the same composition.

Tensile Lap-Shear Strength

The tensile lap-shear strengths obtainable with the exemplary compositions were determined using the test specimens prepared as described above. The lap-shear strength measurements were conducted according to DIN EN 1465 standard. The speed of tensile testing rate was 10 mm/min.

For measuring the lap-shear strength, the test specimen in its temporary shape was inserted between two electrolytically galvanized DC04 steel (eIoZn) plates having dimensions of 100 mm×25 mm×1.5 mm. The lower surface of the test specimen having dimensions of 25 mm×10 mm was in direct contact with the upper surface of the lower metal plate. The test specimen were then expanded and cured at a temperature of 180° C. for a time period of 30 minutes.

The lap-shear strengths presented in Table 2 have been obtained as an average value of three measurements conducted with the same composition.

TABLE 2

| Composition [wt.-%] | Ex-1 | Ex-2 | Ex-3 | Ex-4 | Ex-5 | Ex-6 | C Ex-1 | C Ex-2 | C Ex-3 |
|---|---|---|---|---|---|---|---|---|---|
| Araldite GT7004 | 32.82 | 32.71 | 38.06 | 45.46 | 35.43 | 22.24 | 63.29 | 59.52 | 50.51 |
| DEN 431 | 4.69 | 4.67 | 5.44 | 2.98 | 5.06 | 3.18 | — | — | — |
| Toughening agent | 9.38 | 9.35 | 10.87 | 5.97 | 10.12 | 6.35 | — | — | — |
| Engage 8450 | 28.57 | 28.48 | 24.54 | 24.57 | 22.85 | 39.96 | 25.32 | 29.76 | 40.40 |
| CS 7938 | 6.35 | 6.33 | — | — | 6.86 | 10.11 | — | — | — |
| HDK H18 | 2.12 | 2.11 | 2.45 | 2.46 | 2.29 | 2.13 | 9.49 | 8.93 | 7.58 |
| Talk ST60 | 2.12 | 2.11 | 2.45 | 2.46 | 2.29 | 1.60 | — | — | — |
| Scotchlite S60 | 6.35 | 6.33 | 7.36 | 7.37 | 6.86 | 7.98 | — | — | — |
| Omyacarb 5GU | 3.17 | 3.16 | 3.68 | 3.69 | 3.43 | 2.66 | — | — | — |
| Marcus Wax M200 | 3.17 | 3.16 | 3.68 | 3.69 | 3.43 | 2.35 | — | — | — |
| Dyhard SF100 | 0.95 | 1.27 | 1.10 | 0.98 | 1.03 | 1.09 | 1.58 | 1.49 | 1.26 |
| Dyhard UR700 | 0.32 | 0.32 | 0.37 | 0.37 | 0.34 | 0.35 | 0.32 | 0.30 | 0.25 |
| Tot Results | 100.00 | 100.00 | 100.00 | 100.00 | 100.00 | 100.00 | 100.00 | 100.00 | 100.00 |
| Recovery rate (7 to 4 mm) [%] | 110 | 112 | 104 | 110 | 107 | 97 | 56 | 56 | 87 |
| Lap shear strength (7 to 4 mm) [Mpa] | 5.53 | 5.5 | 3.91 | 4.39 | 3.41 | 2.12 | 4.96 | 3.98 | 3.63 |

The invention claimed is:

1. A composition comprising:
   i) a curable adhesive comprising:
      a) at least one epoxy resin and
      b) at least one epoxy resin modified acrylonitrile-butadiene copolymer, and
   ii) at least one thermoplastic elastomer, wherein
   the at least one thermoplastic elastomer is present in the curable adhesive as a penetrating polymer network, and
   the composition contains a semi-interpenetrating polymer network (S-IPN) comprising a first continuous phase comprising the curable adhesive and a second continuous phase comprising the at least one thermoplastic elastomer.

2. The composition according to claim 1, wherein the at least one thermoplastic elastomer has a melting temperature ($T_m$), which is above the glass transition temperature of the curable adhesive and/or wherein the curable adhesive has a glass transition temperature ($T_g$) in the range of 23-95° C.

3. The composition according to claim 1, wherein the at least one thermoplastic elastomer is present in an amount in a range of 15-40 wt.-%, based on the total weight of the composition.

4. The composition according to claim 1, wherein the at least one thermoplastic elastomer is selected from the group consisting of ethylene based olefin copolymers, propylene-based olefin copolymers, and ethylene vinyl acetate copolymers.

5. The composition according to claim 1, wherein the at least one epoxy resin is present in an amount in a range of 20-70 wt.-%, based on the total weight of the composition.

6. The composition according to claim 1, wherein the at least one epoxy resin modified acrylonitrile-butadiene copolymer is present in an amount in a range of 1.0-30.0 wt.-%, based on the total weight of the composition.

7. The composition according to claim 1, wherein the at least one epoxy resin modified acrylonitrile-butadiene copolymer comprises at least one acrylonitrile-butadiene rubber in an amount in a range of 5-50 wt.-%, based on the weight of the at least one epoxy resin modified acrylonitrile-butadiene copolymer.

8. The composition according to claim 1, wherein the curable adhesive is a thermally curable adhesive.

9. The composition according to claim 1, further comprising at least one inorganic fiber filler in an amount in a range of 0.5-20.0 wt.-%, based on the total weight of the composition.

10. An expandable article composed of the composition according to claim 1, wherein the at least one thermoplastic elastomer is in a compressed state.

11. The expandable article according to claim 10 obtained by subjecting the composition to a reversible deforming process comprising:
   I) providing the composition,
      wherein
      the at least one thermoplastic elastomer is present in the curable adhesive as the penetrating polymer network in an original shape, in which the at least one thermoplastic elastomer is in a relaxed state,
   II) heating the composition in its original shape to a temperature above the glass transition temperature of the curable adhesive and below the melting temperature of the at least one thermoplastic elastomer,
   III) mechanically deforming the heated composition from its original shape to a different temporary shape, in which the at least thermoplastic elastomer is in compressed state, and
   IV) cooling the composition in its temporary shape to a temperature below the glass transition temperature of the curable adhesive.

12. A reinforcing element for reinforcing cavities of structural components comprising a support and the expandable article according to claim 10, which is indirectly or directly attached to a surface of the support.

13. A method for reinforcing cavities of structural components, comprising:
   i') placing the reinforcement element according to claim 12 in a cavity of a structural component,
   ii") heating the expandable article to a temperature above the glass transition temperature of the curable adhesive, and
   iii") curing of the curable adhesive.

14. The method according to claim 13, wherein the curable adhesive is cured by heating.

15. A method comprising: applying the composition according to claim 1 as a shape memory material.

16. A composition comprising:
   i) a curable adhesive comprising:
      a) at least one epoxy resin and
      b) at least one epoxy resin modified acrylonitrile-butadiene copolymer, and
   ii) at least one thermoplastic elastomer selected from the group consisting of ethylene based olefin copolymers, propylene-based olefin copolymers, and ethylene vinyl acetate copolymers,
wherein the at least one thermoplastic elastomer is present in the curable adhesive as a penetrating polymer network.

* * * * *